Jan. 14, 1930.    F. R. CARRINGTON    1,743,318
METHOD OF AND APPARATUS FOR TESTING ELECTRICAL CONDUCTORS
Filed Aug. 9, 1927
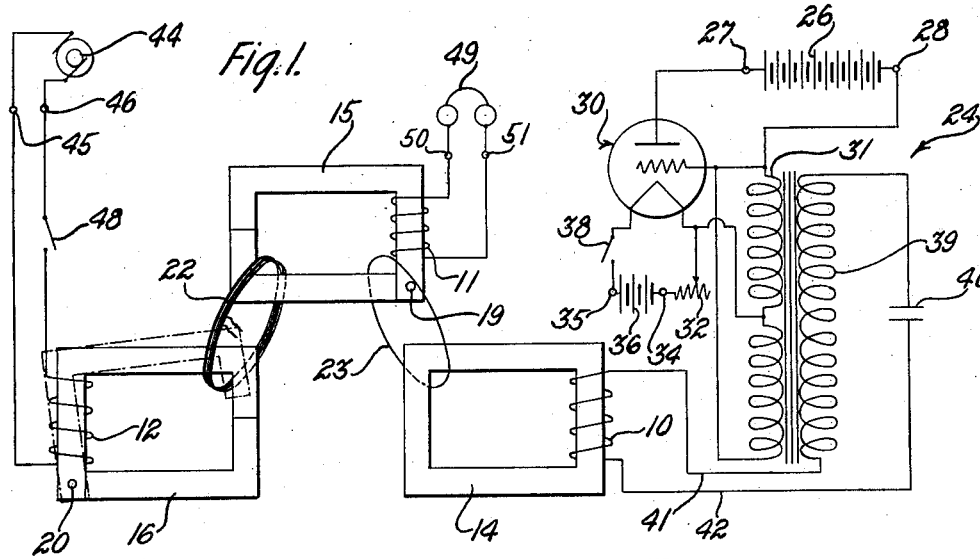
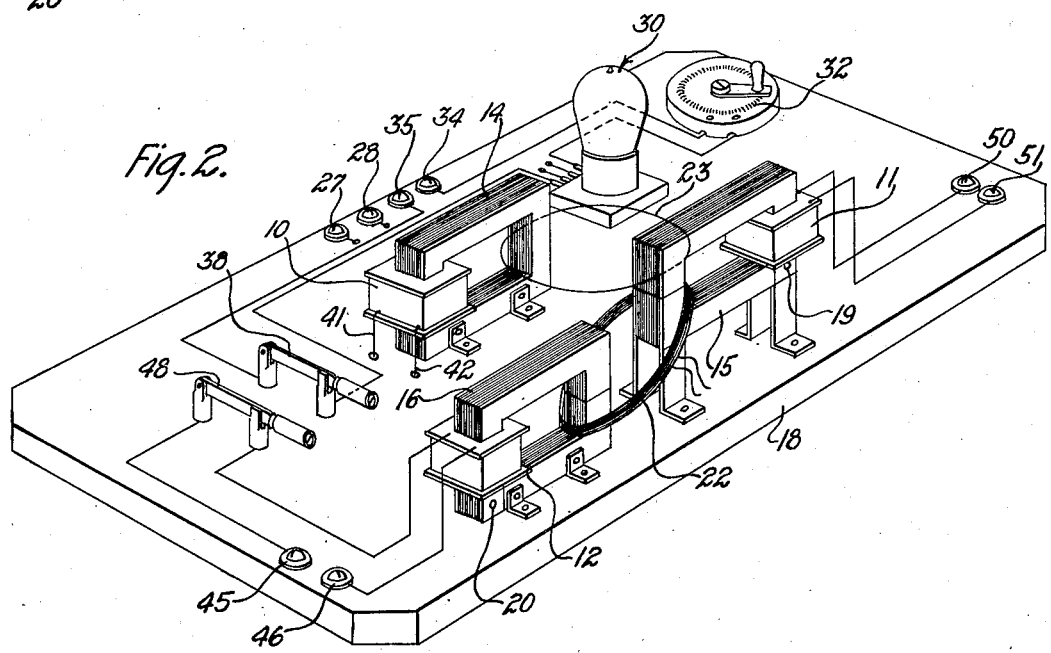
Inventor
Foster R. Carrington
by H. A. Patton Att'y.

Patented Jan. 14, 1930

1,743,318

UNITED STATES PATENT OFFICE

FOSTER RUSSELL CARRINGTON, OF CICERO, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR TESTING ELECTRICAL CONDUCTORS

Application filed August 9, 1927. Serial No. 211,707.

This invention relates to methods of and apparatus for testing electrical conductors, and more particularly to methods of and apparatus for determining short circuits in coiled conductors.

In the production of electrical equipment, such as coiled conductors, completed coils are in some instances tested for short circuited turns. Thus to test coils consisting of conductors of small cross-sectional area such as insulated turns of delicate wire for resistance or impedance, great care and skill must be exercised and considerable time expended in conducting the test for each coil.

The primary objects of this invention are to provide an improved and efficient method of and conveniently operable apparatus for expeditiously testing short circuits in electrical conductors.

In accordance with the general features of the invention, the improved method may be very effectively practiced by inductively coupling a fixed inductance with an inductance included within a receiver circuit by means of a single closed turn of wire or standard which is the same in size as a turn of the coil to be tested. Another fixed inductance may be coupled with the inductance of the receiver circuit by the coil to be tested and oscillatory alternating voltages differing slightly in frequency may then be impressed upon the two fixed inductances. If a turn of the coil is short circuited, the frequencies will be impressed upon the receiver circuit and distinct beat notes will be produced in the receiver circuit which are readily detectable.

These and other objects will be apparent from the following detailed description when considered with the accompanying drawing, wherein Fig. 1 is a circuit diagram of an apparatus whereby the improved method may be efficiently practiced, and Fig. 2 is a perspective view of a test set employing the electrical equipment disclosed in Fig. 1.

Referring now to the drawings wherein like numerals have been employed to designate similar parts throughout the various figures, it will be observed that three inductance coils 10, 11 and 12, respectively, are coupled with companion laminated cores 14, 15 and 16. These inductance coils and their associated cores are sufficiently separated from each other to eliminate any deleterious effects which may be caused from stray fields due to currents flowing through these inductances. To further eliminate the effects of stray fields the core 15 is located in an elevated position with respect to the other cores, all of said cores being carried by a mounting plate 18. The cores 15 and 16 are hinged at 19 and 20, respectively, to permit the insertion therebetween of a coil 22 which is to be tested for short circuits. It will be apparent that the coil 22 when placed in the position disclosed in Figs. 1 and 2 will serve to link or couple the magnetic circuits containing the inductances 11 and 12. A closed turn of wire 23 which is similar in size to a turn of wire in the coil 22 is employed as a standard and serves to couple the magnetic circuits containing the inductances 10 and 11.

In order to supply an oscillating current of desired frequency to the inductance coil 10, any suitable means may be employed such as a supply circuit denoted generally by the numeral 24 (Fig. 1). This supply circuit 24 includes a direct current supply, such as a battery 26, which is connected between terminal posts 27 and 28 as shown in Figs. 1 and 2. The terminal post 27 is electrically connected with the plate of a vacuum tube 30 and the terminal 28 is connected with an inductance coil 31. One terminal of the filament of the vacuum tube 30 is connected with a variable resistance 32 which is in turn connected with a terminal post 34 and interposed between this terminal post 34 and a terminal 35 is a battery 36 (Fig. 1). The terminal post 35 is connected to the other terminal of the filament through a suitable switch 38 and an oscillatory circuit including an inductance coil 39 and a condenser 40 is coupled with the vacuum tube circuit just described. This oscillatory circuit also includes the inductance coil 10 which is connected within the circuit by means of conductors 41 and 42.

The inductance coil 12 may be connected with a source of alternating current supply of the type shown in the circuit 24, or as shown in Fig. 1, it may be connected with a conventional alternator 44. This alternator 44 is connected to terminal posts 45 and 46 and a switch 48 operates to open and close the circuit containing the alternator 44 and the inductance coil 12. The inductance coil 11 is included within a circuit containing a receiver 49 of any usual type, which is connected between terminal posts 50 and 51.

From the foregoing description it will be understood that by closing the switch 38 of the circuit containing the vacuum tube 30, the oscillatory circuit containing the inductance coil 39 and condenser 40 will be affected so as to produce an oscillatory current within the inductance coil 10. The standard conductor loop 23 couples the magnetic circuit containing the inductance 10 and the core 14 with the magnetic circuit containing the core 15 and the inductance coil 11, and it will be apparent that if the magnetic circuit containing the coil 11 is also inductively coupled with another magnetic circuit supplied with an oscillating current which slightly varies in frequency from the first-mentioned current, a beat note may be detected by the receiver 49. Thus if the coil 22 which links the magnetic circuit containing the coil 11 with the circuit containing the coil 12 has a short circuited turn, a beat note will be detected by the receiver 49 providing that the frequency of the current supplied by the alternator 44 varies slightly from the frequency of the current supplied by the oscillatory circuit. Thus, for example if an oscillatory alternating current of a frequency of 780 cycles is supplied to the coil 10 and an oscillatory alternating current having a frequency of 775 cycles is simultaneously supplied to the coil 12, these frequencies being imposed upon the coil 11 will produce beats in the receiver or detector circuit which may be readily detected by the receiver 49.

This invention has a very practical application in connection with the testing of coils constituting a plurality of turns of very delicate conductors which are insulated from each other by a very thin coating of insulating compound. As already suggested, testing such delicate coils by resistance and inductance methods to determine the presence of short circuited turns, presents difficult problems of calibration and adjustment and it will be apparent that the described method and apparatus precludes the necessity of making careful and extended resistance or impedance measurements and yet provides a very positive test for determining the presence of short circuited turns. In associating the coil to be tested, it is only necessary to raise the upper sections of the laminated cores 15 and 16 to the position indicated by the dot and dash lines in Fig. 1 to permit the insertion of the coil and in this manner the successive testing of a large number of coils can be speedily conducted and the individual coils subjected to a minimum amount of handling during the testing operation. The described apparatus which may be employed to practice the improved method presents a very compact, and self-contained test set, which may be conveniently moved about a laboratory and the successful operation of the instrument does not necessitate a high degree of skill and care on the part of the operator.

Although the invention has been described in connection with the testing of coils of the type disclosed in Figs. 1 and 2, it is to be understood that the invention is capable of many other applications and should be limited only by the scope of the appended claims.

What is claimed is:

1. The method of testing electrical conductors, which consists in coupling a conductor to be tested and a standard conductor with inductances, supplying currents of different frequencies to the inductances to produce beat notes, and then detecting the beat notes.

2. The method of testing coiled conductors, which consists in subjecting a standard conductor to a magnetic field, subjecting a coil to be tested to another magnetic field, and then testing for beat notes resulting from the subjection of the coil and the standard to the magnetic fields.

3. The method of testing coiled conductors for short circuited turns, which consists in inductively coupling a fixed inductance with separate inductances by a coil to be tested and a closed turn of a standard conductor, supplying currents of different frequencies to the inductances, and then detecting the electrical effects produced as a result of the presence of a short circuited turn in the coil.

4. The method of testing coiled conductors for short circuited turns, which consists in inductively coupling a fixed inductance with two inductances by a coil to be tested and a closed turn of an equivalent conducting material, simultaneously supplying currents of different frequencies to the inductances, and detecting beat notes produced in the fixed inductance as a result of the presence of a short circuited turn in the coil.

5. In apparatus for testing conductors, a detecting circuit, an oscillatory circuit, a standard conductor inductively coupling the detecting circuit with the oscillatory circuit, and an electrical supply circuit designed to be inductively coupled with the detecting circuit by the conductor to be tested.

6. In apparatus for testing conductors, a detecting circuit containing an inductance coil, an oscillatory circuit containing an inductance coil, a standard conductor for inductively coupling the coils, and an electrical supply circuit including an inductance coil designed to be coupled with the detecting circuit by a coil to be tested.

7. In apparatus for testing conductors, a detecting circuit containing an inductance coil, a hinged core member associated with the coil, an oscillatory circuit containing an inductance coil, a core member associated therewith, a standard conductor for inductively coupling the inductance coils, an electrical supply circuit including an inductance coil and a hinged core member associated therewith.

8. In apparatus for testing conductors, a mounting plate, a plurality of core members arranged in spaced relation on the mounting plate, a detecting circuit including an inductance coil associated with one of the core members, an oscillatory circuit including an inductance coil associated with another of the core members, a standard conductor loop coupling the inductances, and an electrical supply circuit including an inductance coil associated with another of the core members.

9. The method of testing electrical conductors, which consists in individually coupling a conductor to be tested and a standard conductor with inductances, inductively associating the conductor to be tested and the standard conductor with a common inductance, inductively associating the conductor to be tested and the standard conductor with a conmmon inductance, supplying currents of different frequencies to the first mentioned inductances, and observing the effect of said current upon the common inductance.

10. The method of testing electrical conductors, which consists in inductively coupling a conductor to be tested and an equivalent turn of conducting material with inductances, inductively associating the conductor to be tested and the standard conductor with a common inductance, supplying currents of different frequencies to the first mentioned inductances to produce beat notes, and detecting said best notes.

11. The method of testing electrical conductors, which consists in inductively associating a standard conductor and a conductor to be tested with a common fixed inductance, inductively associating the standard conductor with a current of predetermined frequency, inductively associating the conductor to be tested with a current of a different frequency, and then observing the effect of the currents upon said fixed inductances.

12. In an apparatus for testing conductors, a standard conductor, a fixed inductance, means for inductively associating the standard conductor and a conductor to be tested with the fixed inductance, means for inductively associating the standard conductor and the conductor to be tested with currents of different frequencies and means for observing the effect of said currents upon the fixed inductance.

In witness whereof, I hereunto subscribe my name this 28th day of July A. D., 1927.

FOSTER RUSSELL CARRINGTON.